United States Patent [19]

Christensen

[11] Patent Number: 4,751,687
[45] Date of Patent: Jun. 14, 1988

[54] METHODS OF REDUCING HARMONIC DISTORTION IN CONTINUOUS WAVE SEISMIC EXPLORATION

[75] Inventor: Elmo W. Christensen, Tulsa, Okla.

[73] Assignee: Industrial Vehicles International, Inc., Tulsa, Okla.

[21] Appl. No.: 883,990

[22] Filed: Jul. 10, 1986

[51] Int. Cl.[4] .................... H04R 23/00; H04B 15/04; G01V 00/00
[52] U.S. Cl. ..................................... 367/22; 328/163; 367/143; 367/190; 364/421
[58] Field of Search ....................... 367/45, 46, 48, 49, 367/189; 328/163, 165; 342/91, 104; 364/421; 73/579, 586

[56] References Cited

U.S. PATENT DOCUMENTS

| | | | |
|---|---|---|---|
| 3,906,383 | 9/1975 | Andre et al. | 328/163 |
| 4,320,398 | 3/1982 | Fritzlen | 342/91 |
| 4,616,352 | 10/1986 | Sallas et al. | 367/190 |
| 4,670,863 | 6/1987 | Sallas et al. | 367/189 |

FOREIGN PATENT DOCUMENTS 2287705  5/1976  France .

OTHER PUBLICATIONS

Geophysical Prospecting, vol. 29, #2, pp. 178-188, 4/81, by Reitsch, E., abstract only provided.

Primary Examiner—Nelson Moskowitz
Attorney, Agent, or Firm—Kanz, Scherback & Timmons

[57] ABSTRACT

Described is a method of driving a seismic vibrator with a control signal to produce an output signal having minimized harmonic distortion. The method includes the steps of producing a plurality a harmonic distortion signals related to a fundamental frequency of the control signal. The phase and amplitude of said harmonic distortion signal is varied to produce with the vibrator suites of variations of the distortion signal. From among suites of variations there is selected that harmonic distortion signal having phase and amplitude values which produce a minimum value in harmonic distortion signal amplitude. The steps are repeated for different fundamental frequencies and the selected signals are summed with their related fundamental frequencies to produce a vibrator sweep control signal. The seismic vibrator is driven with the control signal to produce an output in which harmonic distortion is significantly attenuated.

17 Claims, 8 Drawing Sheets

METHODS OF REDUCING HARMONIC DISTORTION IN CONTINUOUS WAVE SEISMIC EXPLORATION

BACKGROUND OF THE INVENTION

1. Field of the Invention

The present invention relates to seismic exploration, more particularly, it relates to methods for driving a continuous wave seismic source, a vibrator, with a signal having a component effective to significantly reduce harmonic distortion in the output of the vibrator.

2. Discription of the Prior Art

In one method of seismic exploration an elongated, non-repetitive vibratory signal or wave train is injected into the earth. The injected seismic signal is non-repetitive or random during a time interval which is at least as long as the travel time of a reflection wave along the longest travel path of interest. In normal practice the vibratory signal is therefore at least as long as the travel time of the seismic waves to the deepest reflection to be mapped. The most widely used non-repetitive vibratory signal is one whose frequency changes with time from some predetermined beginning frequency to a predetermined ending frequency. These beginning and ending frequencies are selected to produce a desired pulse shape after processing. This signal, commonly called a pilot signal or control signal, may be generated in any one of several known ways including signal generators or the use of prerecorded magnetic tape.

The pilot signal is assumed to be a replica of the seismic signal injected into the earth. In reality, it is only a replica of the signal which controls the vibrating apparatus. There are a number of factors which tend to distort the injected signal. One of the factors being the operational characteristics of the vibrator itself. The other being the media to which the vibrator is coupled.

In seismic exploration operations which utilize vibrators the relatively long sweep signals give rise to received signals in which reflections from successive interfaces of geological formations overlap. Consequently, in order to interpret the vibrator-type seismogram in the same manner as conventional dynamite seismogram where the input signal is a short pulse, the long sweeps occuring in the vibrator seismogram must be compressed to short signals. This is done by correlating the final vibrator-type seismogram with the sweep or pilot signal. Because of the non-linear reaction of the media to which the vibrator is coupled and/or because of the non-linearity in the vibrator drive, the emitted signal is not only the proper sweep signal but also contains its harmonics. In correlating the vibrator-type seismogram these harmonics lead to assymetrical secondary lobes which occur with upsweeps before the main pulse and with downsweeps after the main pulse. One method of suppressing even harmonics is suggested in U.S. Pat. No. 3,786,409 describing a technique utilizing inverted stacking, the essential features of which is that only one half of the elementary seimograms are generated with the proper sweep. The other half of the elementary seismogram is generated with a sweep which has the opposite polarity, and simultaneously the polarity of the seismic data at the input of the receiving system is reversed. The seismograms resulting therefrom are vertically stacked.

Another technique for reducing harmonics is described in U.S. Pat. No. 4,042,910. This technique suppresses both odd and even harmonics by repeatedly injecting a sweep signal into the earth and receiving that signal through suitable means with the phase of the generated signal being shifted relative to the prior signal by a fixed phase angle which is a fraction of two pi and transforming the recorded signals by inverting the fixed phase shifts in order to re-phase the recorded series ofd signals prior to adding them together to produce a composite record.

In common in the prior art techniques is the reduction of harmonics distortion by changing the character of successive sweeps of the vibrator and thereafter treating the received data.

It is an object of the present invention to provide a method wherein harmonics of the emitted sweep signal, the output of the vibrator, are suppressed up to any order desired by utilizing a pilot or control signal including a corrective component such that harmonic distortion in successive received signals are significantly suppressed without further need to treat the received signals.

SUMMARY OF THE INVENTION

The present invention is directed to a method for suppressing noise trains occurring in a vibrator-type seismogram due to harmonics by reducing the harmonics at the vibrator itself. This is accomplished by formulating, on a non-real time basis, a sweep signal determined by a method comprising the steps of producing a plurality of harmonic distortion signals related to a fundamental frequency of the control or pilot signal. The phase and amplitude of the harmonic distortion signal is varied to produce with the vibrator suites of variations thereof. From among the suites of variations is selected that harmonic distortion signal having phase and amplitude values which produce a minimum value in the harmonic distortion amplitude. The foregoing procedure is then repeated for different fundamental frequencies and the selected signals are then summed with their related fundamental frequency to produce a vibrator sweep control or pilot signal. The seismic vibrator is then driven with that sweep or pilot signal with the production at the output of the seismic vibrator of a signal having suppressed harmonic distortion.

More particularly, the method involves the generation of a signal for a fundamental frequency component to be utilized to drive the vibrator which signal is representative of harmonic distortion at that fundamental frequency. The harmonic distortion signal is then varied as a function of time to produce a family of values over a preselected phase range, for example, for testing a vibrator the first time the phase could range from 0° to 360°. The vibrator is then driven with a signal comprised of the sum of the fundamental frequency and the harmonic distortion over the preselected phase range and the output of the vibrator is examined to determine the phase at which the output harmonic distortion of the vibrator is a minimum. There is then established a harmonic distortion signal whose phase is fixed by the value of the determined phase. The fixed phase harmonic distortion signal is summed with the fundamental frequency and the sum signal utilized to drive the vibrator during which the amplitude of the harmonic distortion signal is varied over a predetermined range of amplitudes. The amplitude is then determined at which the output harmonic distortion of the vibrator is a minimum. The foregoing steps are repeated for different values of fundamental frequency to establish a correction signal which is added to the vibrator drive or pilot signal including all the fundamental frequencies to produce a new drive signal. The vibrator is driven with the new drive signal to produce a seismic output signal having minimized or significantly suppressed harmonic distortion.

The initially generated signal representative of harmonic distortion may be related to a single harmonic, in which event the procedure would be repeated for each harmonic whether odd or even, which would be of interest as contributing significantly to the harmonic distortion in the output of the vibrator. On the other hand, the harmonic distortion signal may be generated to include a plurality of harmonics for each related fundamental frequency.

It is not necessary that the vibrator be tested with every fundamental frequency comprising the sweep signal. It is sufficient that, for example, the fundamental frequencies be separated by from 3 to 10 hertz intervals and the resulting correction signal interpolated between the intervals to obtain the amplitude and phase for every harmonic to be corrected for every point in the new drive or pilot signal.

DETAILED DESCRIPTION OF THE INVENTION OF THE PREFERRED EMBODIMENT

Figure 1:
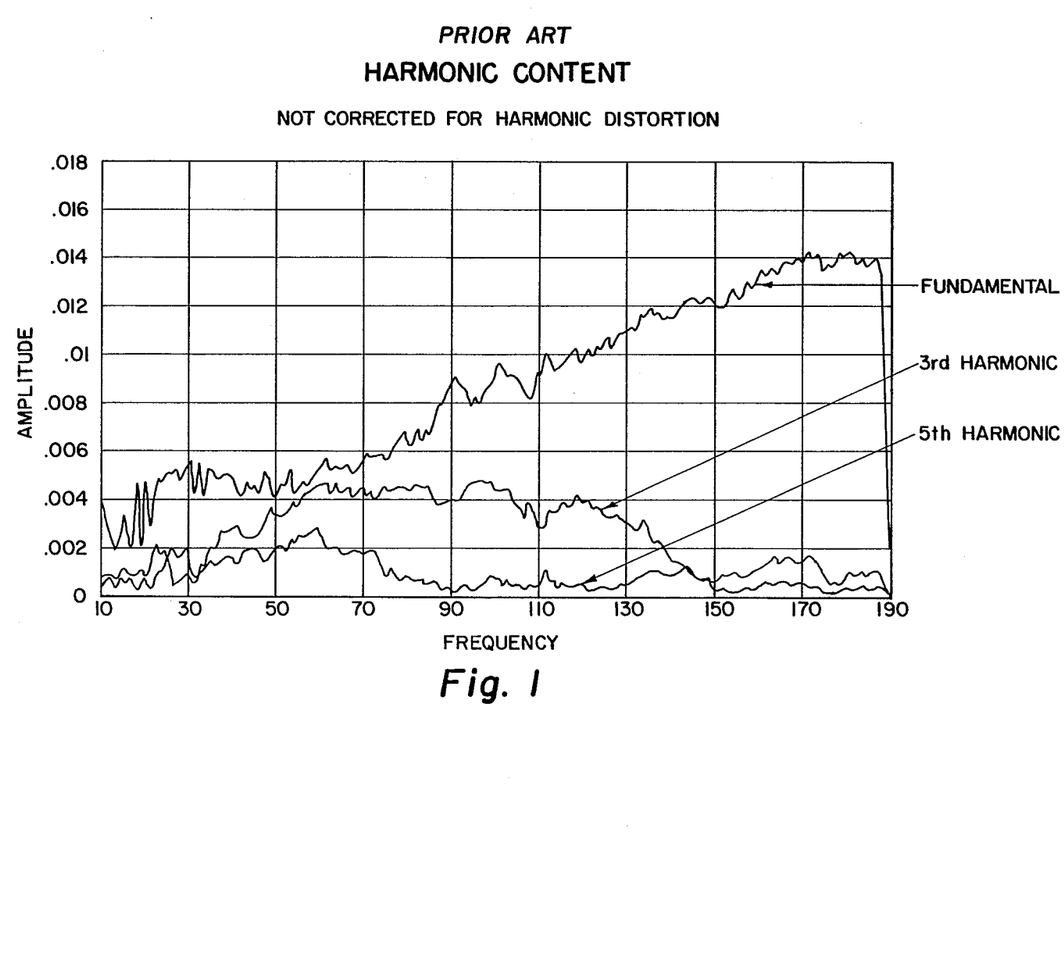
FIG. 1 graphically illustrates the harmonic distortion content of a seismic vibrator output absent the benefit of the present invention.

The harmonic distortion content of a seismic vibrator driven in accordance with prior art methods is illustrated in FIG. 1. The fundamental frequency of the pilot or control signal is shown to range from approximately 10 hertz to approximately 190 hertz. Only the third and fifth harmonics have been illustrated in order to simplify the presentation of the problem introduced by the presence of harmonics. The output signal including the fundamental and the odd harmonics is that of a marine seismic vibrator of the type described and claimed in co-pending U.S. Application of Serge S. Wisotsky Ser. No. 870,992 filed June 5, 1986 and assigned to the same assignee as the present application. The foregoing application was abandoned in favor of continuing application Ser. No. 015,091 filed Feb. 13, 1987. It will be observed that the fifth harmonic is of fairly high amplitude, particularly in the fundamental frequency range of interest, that is from 10 to 40 hertz. The third harmonic also has a significant amplitude approaching that of the fundamental in the frequency range of approximately 40 hertz to 70 hertz. The signal strength of the fifth harmonic is of no interest beyond the fundamental frequency of 40 hertz. The frequency of the fifth harmonic at a fundamental of 40 hertz is 200 hertz which is beyond the upper end of the sweep frequency of the vibrator. Likewise the amplitude or magnitude of the third harmonic beyond 70 hertz would not have any effect upon the resultant seismic records achieved inasmuch as the third harmonic would be beyond the highest sweep frequency. However, within the frequency range of interest, both the fifth and the third harmonics contribute significantly to the harmonic distortion output of the marine vibrator and introduce significant distortion in the reflection signal received during the course of an exploration survey and for reasons earlier discussed.

Figure 2:
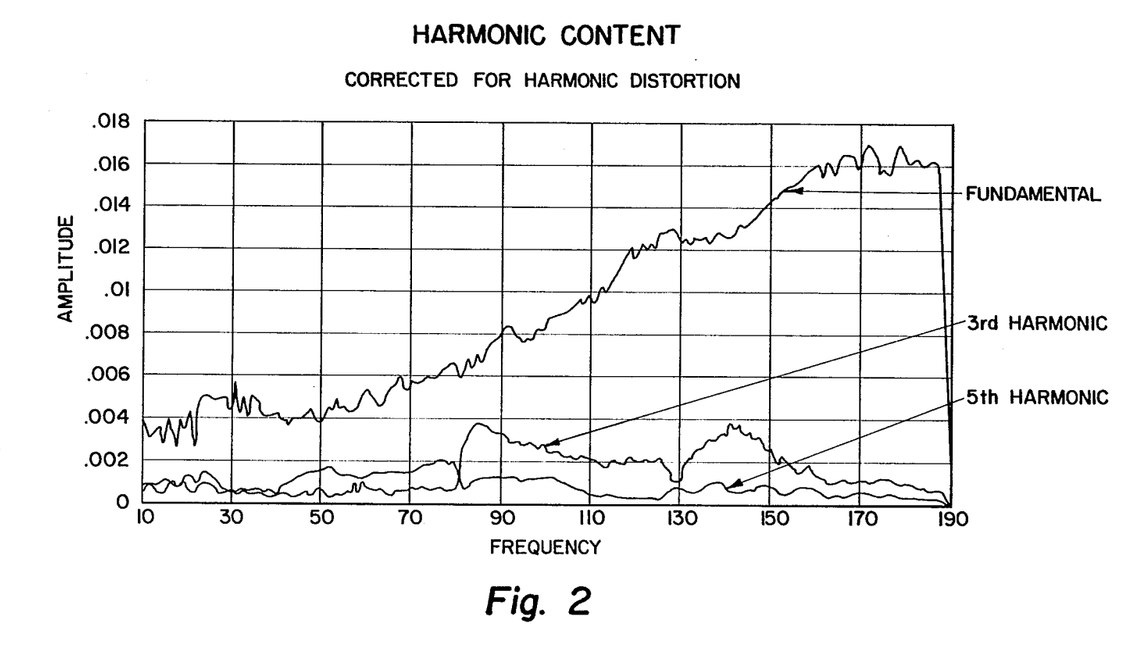
FIG. 2 graphically illustrates the harmonic distortion content of seismic vibrator output corrected for harmonic distortion in accordance with the present invention.

The practice of the present invention significantly lowers the amplitude of the third and fifth harmonics as well as other harmonics not illustrated. The attenuation or minimization of the harmonic distortion is illustrated in FIG. 2 whereupon examination it becomes obvious that the harmonic distortion output of the vibrator benefits significantly from the practice of the present invention. It will be noted that the third harmonic has been reduced from approximately 0.004 (FIG. 1) at about 60 hertz to a value less than 0.001 and that the fifth harmonic has been reduced in amplitude at approximately 40 hertz from about 0.002 (FIG. 1) to less than 0.001.

Figures 3, 4:
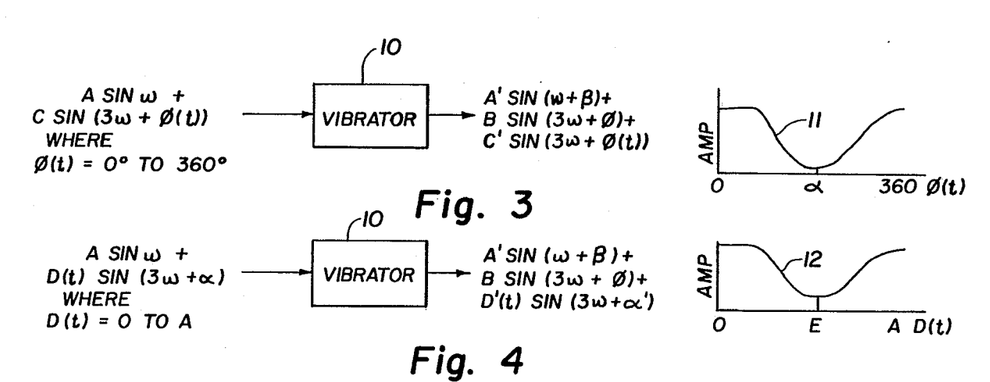
FIG. 3 illustrates input signals to and output signals from a vibrator which signals are expressed mathematically for that portion of the present invention directed to the determination of the phase angle of the harmonic distortion signal resulting in minimum harmonic distortion output from the vibrator.
FIG. 4 illustrates the input signals to and the output signals from a vibrator expressed mathematically in which the harmonic distortion signal has fixed phase and the amplitude is varied to determine that amplitude which results in minimum value of the harmonic distortion in the output of the vibrator.
Figure 5:
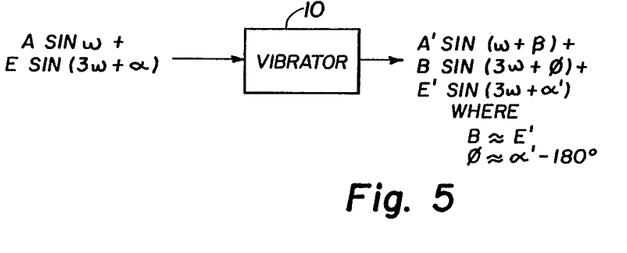
FIG. 5 illustrates the result of the present invention wherein the appropriate input signal gives rise to a vibrator output signal with minimum harmonic distortion.

The reduction in harmonic distortion results from the practice of the present invention which generally may be understood by reference to FIGS. 3, 4 and 5. Basically, the invention contemplates the determination of a harmonic distortion signal which when added to a fundamental representing one fundamental frequency of the sweep frequency gives rise to the generation in the output of a harmonic distortion signal which is approximately equal in amplitude to and of opposite phase to the harmonic distortion signal generated by a vibrator in response to the application of the fundamental frequency. As shown in FIG. 3 and utilizing the third harmonic ($3\omega$) as an example. The fundamental input frequency $A \sin \omega$ has added thereto a distortion signal $C \sin(3\omega + \phi(t))$. This combined signal is utilized as a drive signal to a vibrator 10 and the phase $\phi(t)$ of the third harmonic is varied from approximately 0° to 360° while the amplitude C remains a constant. At each phase angle there results in the output of the vibrator a signal $$A' \sin(\omega+\beta)+B \sin(3\omega+\phi)+C' \sin(3\omega+\phi'(t)) \quad (1)$$

where;
- A' is the resultant output of the amplitude of the fundamental,
- β is a phase shift in the fundamental frequency,
- B is the amplitude of the third harmonic resulting from the fundamental,
- φ is the phase of the third harmonic resulting from the fundamental,
- C' is the amplitude of the third harmonic resulting from the third harmonic input to the vibrator 10, and
- φ'(t) is the instantaneous value of the phase angle of the immediately foregoing third harmonic.

The phase angle φ(t) of the third harmonic input is varied over a predetermined range of phase angles. For example the range could be 0° to 360° in the case of initial testing of a vibrator. Having tested the vibrator and determined the phase angle associated with minimum harmonic distortion, the range over which the phase angle is varied can be narrowed for subsequent test of the vibrator and of other like vibrators. At each selected phase angle the amplitude of the third harmonic is plotted as a function of phase angle to produce the graph 11. As illustrated, the amplitude of the graph 11 varies as a function of phase and there is a minimum at the phase angle α. Having determined the phase angle α at which the graph 11 is a minimum there is now established a second representation of the third harmonic defined by the expression:

$$D(t) \sin (3\omega+\alpha) \quad (2)$$

where: D(t) represents a variable amplitude.

The fixed phase distortion signal is added to the fundamental A sin ω and applied to the input as a control signal to drive the vibrator. The amplitude of D(t) of the third harmonic signal is varied as a function of time. At each discrete value of the amplitude a measure is made of the third harmonic output of the vibrator 10 which third harmonic output is represented by the expression:

$$B \sin(3\omega+\phi)+D''(t) \sin (3\omega+\alpha'). \quad (3)$$

The measured amplitude of the sum of the third harmonic signals is plotted as a function of amplitude and as illustrated the graph 12 will vary as a function of amplitude. At some value E of amplitude the graph 12 will have a minimum value. Having now determined the amplitude and the phase of a correction signal at a given fundamental which gives rise to minimum values in third harmonic distortion, there is produced a correction signal at that fundamental as shown in FIG. 5 to be represented by the expression:

$$E \sin(3\omega+\alpha). \quad (4)$$

This correction signal, when summed with the fundamental signal A sin w gives rise to an output expressed by $$A' \sin(\omega+\beta)+B \sin(3\omega+\phi)+E'' \sin(3\omega+\alpha') \quad (5)$$

where:

$$B \approx E'$$

$$\phi \approx \alpha - 180°.$$

Having determined the correction signal or harmonic distortion signal having phase and amplitude values which will produce a minimum value in harmonic distortion signal output of the vibrator at a given fundamental frequency the steps are repeated for other harmonics. For example, the second and fifth harmonics each will give rise to a suite of variations or graphs 11, 12 which are utilized to determine the phase angle and amplitude of the corrective harmonic inputs to the vibrator resulting in minimum harmonic distortion for each of the harmonics in the output of the vibrator.

In the alternative the input signal may comprise a plurality of harmonics at a given fundamental and the analysis performed to produce at each phase angle and at each amplitude a suite of variations for each of the harmonics. Whichever procedure is employed the process is repeated for different values of fundamental frequency comprising the sweep or pilot signal ultimately to produce a vibrator sweep signal comprised of the fundamental frequencies and their related corrective harmonic signals. This summed vibrator sweep control signal is then utilized to drive the seismic vibrator to produce an output seismic signal in which the harmonic distortion is significantly attenuated.

The harmonic distortion signal related to a given fundamental utilized in the initial steps of the present invention, for example, the signal C sin (3ω+φ(t)) may be produced or generated by applying the fundamental A sin w directly to the input of the vibrator and measuring the distortion at various harmonics in the output of the vibrator. In the alternative there may be generated, with a computer, a data bank of fundamental frequencies and harmonic distortion signals from which may be selected the necessary data to produce the composite signal input to the vibrator 10 in the determination ultimately of the harmonic correction signal. The latter procedure is preferred in that it is less time consuming to utilize a computer to generate a data bank rather than to utilize the vibrator 10 in the generation of the data. The generation of the data bank may be accomplished with the use of a personal computer, for example, an IBM AT. This size of computer is more than adequate to perform the necessary computations in the generation of the data bank as well as to carry out all the other necessary steps ultimately in the formulation of the vibrator weep control signal giving rise to reduced harmonic distortion in the output of the vibrator.

Figure 6:
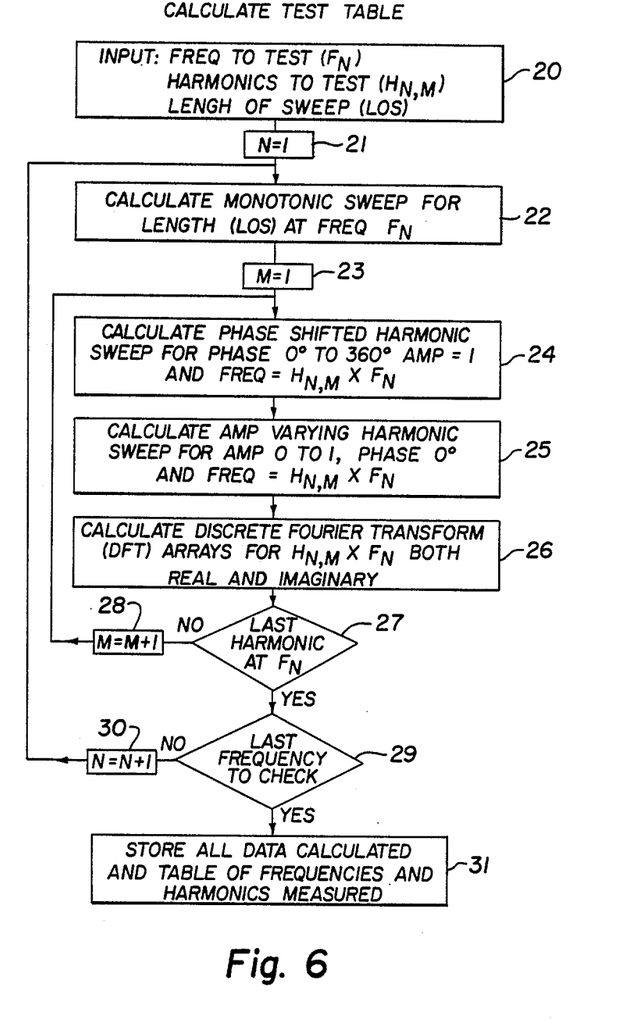
FIG. 6 is a flow diagram illustrating the procedure for establishing a data base comprised of fundamental frequencies and calculated harmonics of interest.

A procedure for generating or producing a bank of data useful for the initial as well as subsequent testing of vibrators is illustrated by the flow diagram in FIG. 6. The input to the program is defined in step 20 as being comprised of the frequencies to be tested ($F_N$) the harmonics to be tested $H_{N,M}$ as well as the length of sweep LOS. M and N are indices. The first frequency to be tested is indexed at 21 and applied to step 22 where there is calculated the monotonic sweep for the length of sweep (LOS) at the frequency $F_N$. The first harmonic to be tested, is indexed at 23 and applied to step 24 where there is calculated the phase shifted harmonic sweep for phases over a range from 0° to 360° and with an amplitude of 1. The frequency is equal to the number of the harmonic multiplied by the selected fundamental frequency or $H_{N,M} \times F_N$. In step 25 there is calculated an amplitude varying sweep for an amplitude varying from 0 to 1 with a constant phase of 0°. The frequency again is equal to the number of the harmonic times the fundamental frequency being tested. Discrete Fourier Transform (DFT) arrays are calculated in step 26 for the harmonics $H_{N,M} \times F_N$. The calculation includes both the real and imaginary values. Step 27 is a decision making point in the program where the question is asked is this the last harmonic at the fundamental frequency $F_N$. If the answer is "No", the harmonic is incremented in step 28 to the next harmonic of interest and steps 24, 25 and 26 repeated for this next harmonic. When the last harmonic has been tested the next decision point is in step 29 where the question is asked whether this is the last fundamental frequency to be checked. If the answer is "No", the frequency is incremented by one to the next frequency of interest by step 30 and steps 22–27 are then repeated for this next frequency. When the last frequency has been checked, all data calculated in the foregoing steps are stored at step 31 where there is formed a table of frequencies and calculated harmonics to be utilized in the testing of the vibrator.

Figure 7A:
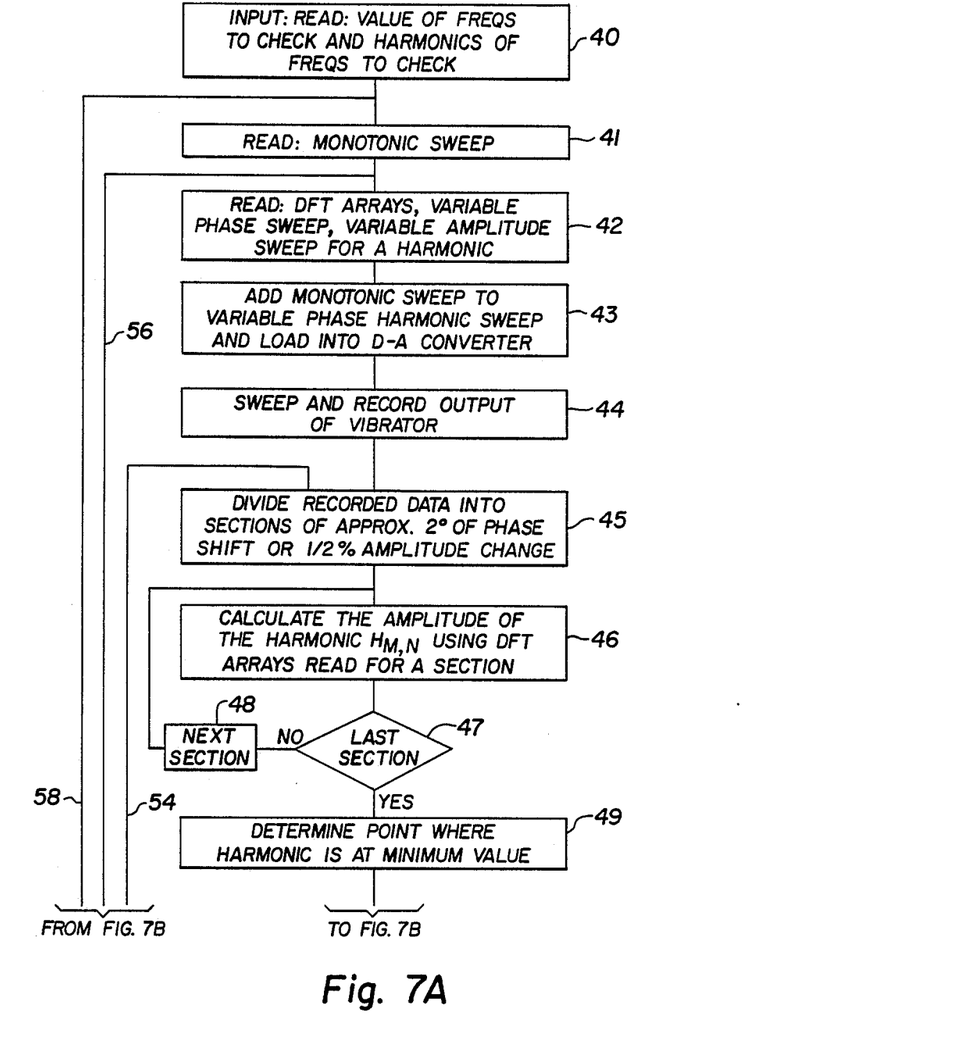
FIGS. 7A and 7B are flow diagrams illustrating the procedure by which the data of FIG. 6 are utilized to drive the vibrator in the production of a correction signal ultimately to be utilized as part of the pilot or control signal which significantly attenuates or minimizes harmonic distortion output in the vibrator.
Figure 7B:
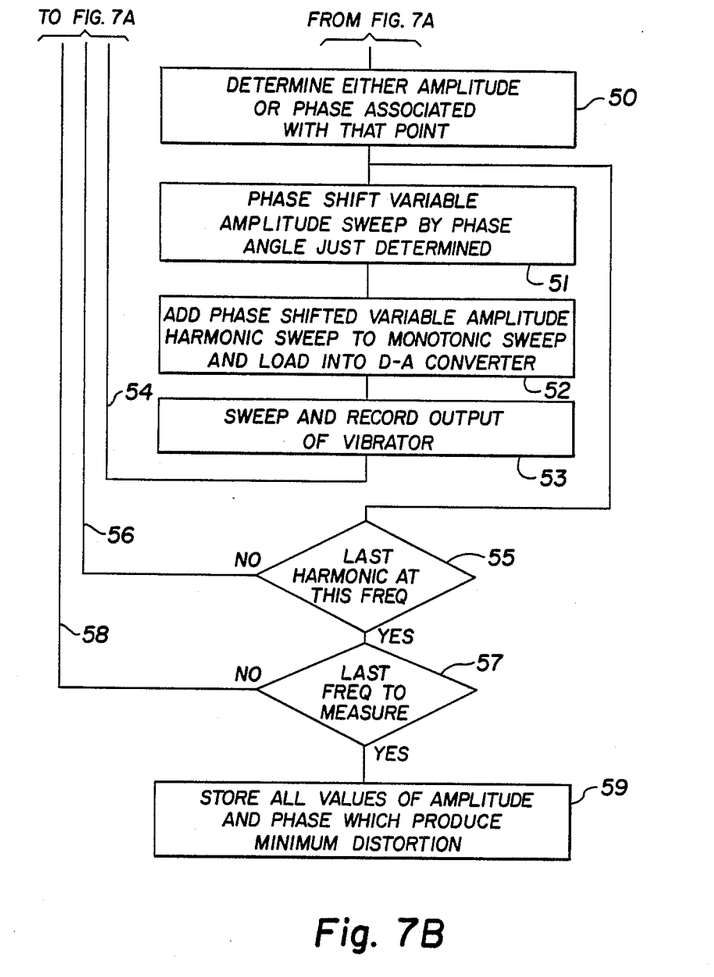

The testing of the vibrator 10 is accomplished by way of a program illustrated in the flow diagrams of FIGS. 7A and 7B where there is determined the parameters for a correction signal which when utilized to control the vibrator will give rise to a vibrator output having attenuated harmonic distortion.

In step 40 there is read into the input the value of the frequencies and the harmonics to be checked. In the practice of the present invention it is not necessary to check every fundamental frequency comprising the fundamental sweep which typically, in the case of the marine vibrator, will extend over a range from 10 hertz to 190 hertz. As discussed earlier, the fundamental frequency of interest where the second harmonic is concerned would be a fundmental frequency of from 10 to 100 hertz, for the third harmonic it would be a frequency of from 10 to approximately 65 hertz and for the fifth harmonic a frequency of from 10 to approximately 40 hertz. Even within the frequency ranges of interest it is not necessary to check or to test all the fundamental frequencies and all harmonics. It is adequate for reasons later to be discussed to check the fundamental frequency at intervals from 3 to 5 hertz at the lower fundamental frequencies. In the case of the higher fundamentals, for example, beyond 40 hertz it may be adequate to check the frequencies at intervals of approximately 10 hertz. Likewise, it is not necessary to evaluate all the harmonics, experience will dictate which of the harmonics contribute significantly to the harmonic distortion of the vibrator. Measurements can be conducted, such as those giving rise to the graphs of FIG. 1, to identify significant harmonic effects. After doing so it may be decided to generate corrective signals for only the third and fifth harmonics.

Upon completing the input in step 40 the monotonic sweep at frequency $F_N$ is read in at step 41 and in step 42 there is read in the DFT arrays, the variable phase sweep and the variable amplitude sweep for a selected harmonic. The variable phase harmonic sweep is added to the monotonic sweep in step 43 where it is loaded into a D - A converter and then utilized in step 44 to control or sweep the vibrator and to record the vibrator output. The recorded data are divided in step 45 into sections of approximately two degrees of phase shift and for each section there is calculated in step 46 the amplitude of the harmonic $H_{M,N}$ utilizing the DFT arrays. The calculation of step 46 is repeated for each section. The decision is made in step 47 as to whether the section calculated is the last section. If it isn't step 48 calls the next section. Upon calculation of the value of the last section there is then determined in step 49 the point in the calculated data where the harmonic distortion is at a minimum value. These foregoing steps detail the operations that are conducted in conjunction with the determination of minimum distortion and the identification in step 50 of the phase associated with the point representing minimum value. Having determined the phase associated with the minimum harmonic distortion in step 50 for a given harmonic, a decision is made at step 55 as to whether this is the last harmonic to be considered at this particular fundamental frequency. If not the harmonic is incremented by way of path 56 and the foregoing steps are repeated with a new harmonic beginning with step 42.

A variable amplitude sweep and more particularly, the sweep signal $D(t) \sin(3\omega + \alpha)$ is now formed in step 51 where $\alpha$ is the phase associated with the minimum value of the distortions associated with the third harmonic $3\omega$. The phase shifted variable amplitude harmonic sweep is added in step 52 to the monotonic sweep and loaded into a D to A converter for use in sweeping or controlling the vibrator whose output is recorded in step 53. Amplitude $D(t)$ of the sweep is shown varied from 0 to 1. However, the amplitude range may be more narrow. The recorded output or data resulting from the foregoing sweep is then applied by way of path 54 to step 55 where the recorded data is divided into sections of approximately one half percent amplitude change and steps 46 through 50 are repeated to determine the amplitude of signal giving rise to the lowest amplitude or value of harmonic distortion for that selected fundamental as well as the identified or selected harmonic.

Following the determination of the phase and the amplitude resulting in minimum harmonic distortion for a harmonic the step 55 controls the looping to select the next harmonic of interest until the last harmonic of interest has been examined in the determination of the amplitude and phase associated with the minimum value of harmonic distortion. At decision step 57 a determination is made as to whether or not that the test has been conducted on the last fundamental frequency to be measured. If the answer is "No" then by way of controls transmitted via path 58 a new monotonic sweep is generated utilizing the next fundamental of interest and the foregoing steps repeated until the last frequency of interest as well as the last harmonic of interest at that frequency has been tested or processed. Upon completion of the calculation series there is stored in step 59 all values of amplitude and phase which produce minimum distortion for all harmonics and fundamentals.

The data computed and stored in step 59 of FIG. 7B are now available to be utilized in the generation of a sweep signal for the vibrator 10 which will result in minimized harmonic distortion. One method of generating that signal is illustrated by the flow diagram of FIG. 8. In step 65 the stored values of amplitude and phases are read into the computer. Step 66 inputs the sweep parameters comprised of the sweep start frequency, the sweep end frequency, the length of sweep, the taper lengths of the sweep, non-linear parameters and the number of points in the sweep to define the character of the sweep signal. Each point may be called a sample point and is represented in binary.

Figure 8:
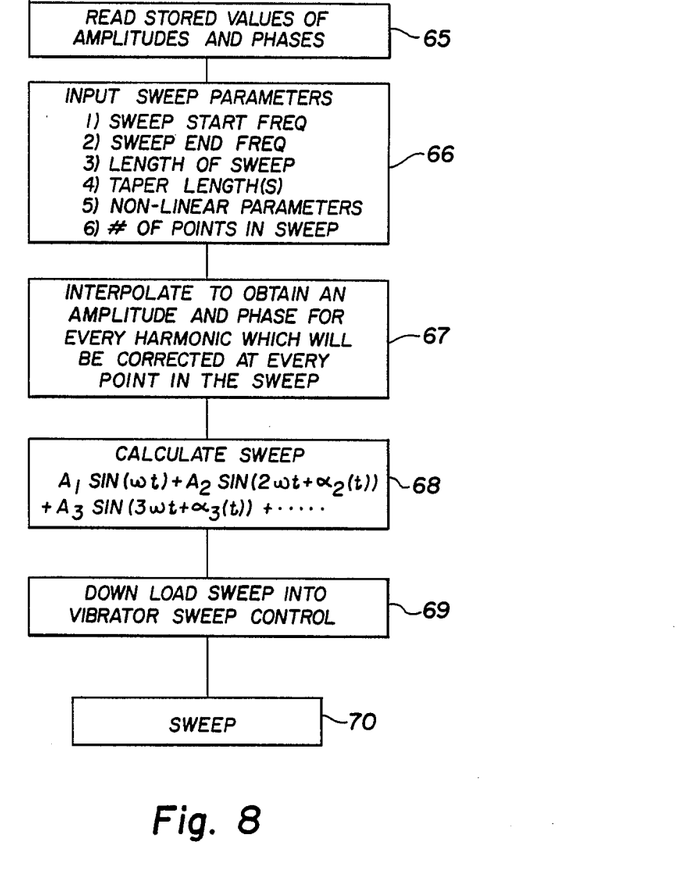
FIG. 8 is a flow diagram depicting the steps or procedure in establishing an appropriate sweep signal for the vibrator including the previously calculated correction signal resulting in an attenuated harmonic distortion output from the vibrator.

It will be recalled that computations are not necessary for every fundamental frequency in the sweep signal and that the fundamentals utilized in the calculation may be separated by an amount from 3 to 10 hertz. That being the case, and inasmuch as a value must be ascribed to each and every point in the sweep, an interpolation procedure is carried out in step 67 to obtain an amplitude and phase for every harmonic which will be corrected at each point in the sweep. The interpolation may be a linear interpolation. Having performed the interpolation in step 67 and assigned values for each point in the sweep, there is now calculated in step 68 the sweep signal $$A_1 \sin(\omega t) + A_2 \sin(2\omega t + \alpha_2(t)) + A_3 \sin(3\omega t + \alpha_3(t)) + \ldots \quad (6)$$

Expression (6) is a general equation specifying the presence of the fundamental $A_1 \sin(\omega t)$ as well as all harmonics. However, it will be understood that only those harmonics will be included which experience, practice and testing have indicated are necessary to reduce the significant harmonic distortions otherwise generated by the vibrator. Having calculated or otherwise generated the sweep in step 69, that signal is now down loaded into the vibrator sweep control in step 69 and utilized to carry out the sweep operation in step 70 which gives rise to a vibrator output in which the harmonic distortion has been significantly reduced.

Figure 9:
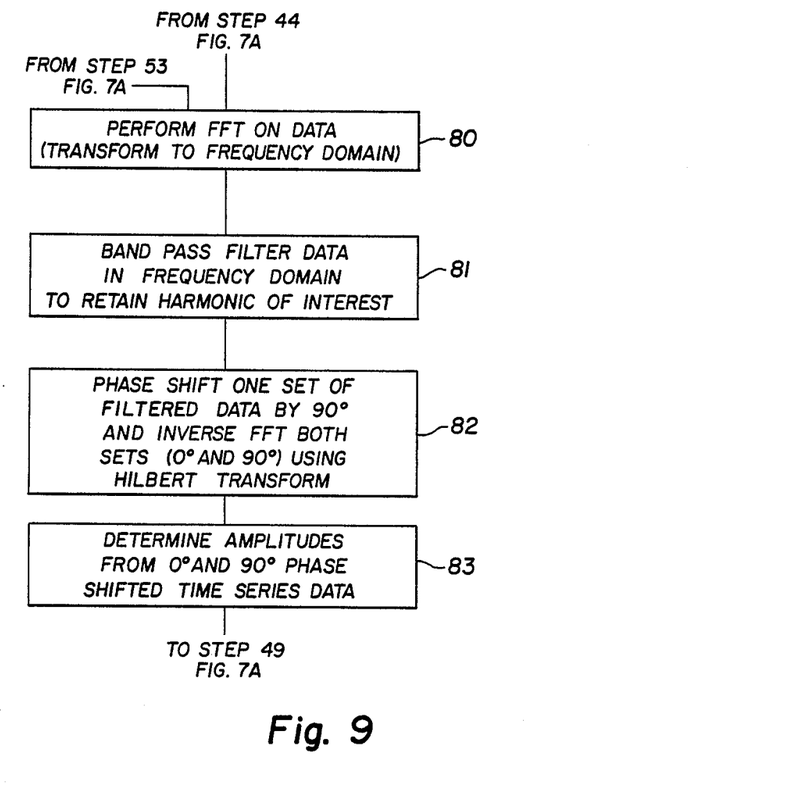
FIG. 9 is a modification to be utilized in the flow diagram of FIG. 7A where the data are transformed from the time domain to the frequency domain and back into the time domain.

FIG. 9 illustrates in flow diagram form an alternate calculation useful in conjunction with the flow diagram of FIG. 7A. This is a more exact technique for calculating the amplitudes and phases of the harmonics. More particularly, the output of the vibrator at step 44 FIG. 7A, if in the time domain is transfered into the frequency domain and a Fast Fourier Transform (FFT) is performed upon that data in step 80. The transformed data is applied to a band pass filter in step 81 to retain the harmonic of interest. In step 82 one set of the band pass filter data is phase shifted by 90 degrees and both sets of data, the 0° and the 90° phase have applied thereto an inverse Fast Fourier Transform. Amplitudes are now determined from the 0° and 90° phase shifted time series data in step 83 and this data is then analyzed in step 59 of FIG. 7A to determine the phase value at which the harmonic is at a minimum value. Having completed the phase determination there is now undertaken the process for determining the amplitude of the signal producing a minimum value of distortion. In doing so the output of the vibrator at step 53 is applied to step 80 and the procedure continued through step 83. The modification of FIG. 9 more exactly performs the analysis than its equivalent in FIG. 7A although the steps of FIG. 7A provide a more rapid calculation of the data.

Now that the invention has been described one or more modifications will become apparent to those skilled in the art and is intended to cover all such modifications as fall within the scope of the appended claims.

What is claimed is:

1. A method of driving a marine vibrator with a sweep control signal which includes a band of fundamental frequencies to produce an output signal having minimized harmonic distortion, said sweep control signal being formulated on a non-real time basis in accordance with the following steps:

(a) producing a harmonic distortion signal related to a fundamental frequency selected from the band of fundamental frequencies of the control signal,
   (b) varying the phase and amplitude of said harmonic distortion signal to produce with the vibrator suites of variations thereof,
   (c) selecting from among suites of variations that harmonic distortion signal having phase and amplitude values which produce a minimum value in harmonic distortion signal amplitude,
   (d) repeating steps (a) through (c) for different ones of said fundamental frequencies comprising said band of frequencies,
   (e) summing each of said selected signals with its related fundamental frequency to produce a vibrator sweep control signal, including said band of fundamental frequencies, and
   (f) driving the marine vibrator with said sweep signal.

2. The method of claim 1 in which steps (a) through (c) are repeated for different harmonics of each fundamental frequency.

3. The method of claim 1 in which said step of producing a plurality of distortion signals is carried out by individually applying each of a plurality of fundamental frequency signals to drive the vibrator and detecting the harmonics in the output of the vibrator.

4. The method of claim 1 in which said step of producing a plurality of distortion signals is carried out by generating for each fundamental frequency of interest independently of the vibrator a phase shifted harmonic sweep whose phase varies from 0° to 360° and whose amplitude is 1.

5. The method of claim 4 in which a harmonic distortion signal is generated having an amplitude varying from 0 to 1 and whose phase is 0.

6. The method of claim 1 in which there is added to a fundamental frequency a harmonic distortion signal related thereto to produce a first vibrator drive signal, driving the vibrator with said drive signal at different phase angles of said drive signal to produce one of said suites of variations.

7. The method of claim 6 in which there is indentified the phase angle which produces the lowest value of harmonic distortion in said suite of variations.

8. The method of claim 7 in which there is added to a fundamental frequency a harmonic distortion signal having the identified phase angle to produce a second vibrator drive signal, driving the vibrator with said signal at different values of amplitude to produce another of said suites of variations.

9. The method of claim 8 in which there is identified the amplitude which produces the lowest value of harmonic distortion in said another suite of variations.

10. The method of claim 9 in which the identified phase angle and amplitude are utilized to establish a correction signal to be added to its related fundamental to provide one component of a vibrator sweep signal productive of reduced harmonic distortion at the output of the vibrator.

11. A method of operating a marine vibrator with a sweep drive signal comprised of a band of fundamental frequencies to produce an output signal having minimized harmonic distortion, said sweep drive signal being formulated on a non-real time basis in accordance with the following steps:

(a) for a selected fundamental frequency of each band to be utilized to drive the vibrator generating a signal representative of a harmonic distortion at that fundamental frequency, (b) varying as a function of time said harmonic distortion to produce a family of values over a predetermined phase range, (c) driving said vibrator with a signal comprised of the sum of said fundamental frequency and said harmonic distortion over said phase range, (d) determining the phase at which output harmonic distortion of the vibrator is a minimum, (e) establishing a harmonic distortion signal whose phase is fixed by the value of said determined phase, (f) summing said fundamental frequency and said fixed phase harmonic distortion signal, (g) driving said vibrator with said sum signal during which the amplitude of said harmonic distortion signal is varied over a predetermined range of amplitudes, (h) determining the amplitude at which output harmonic distortion of the vibrator is a minimum, (i) repeating the aforesaid steps (a) through (h) for different fundamental frequencies of said band to establish said correction signal, (j) adding said correction signal to said band of said fundamental frequencies to produce a new drive signal, and (k) driving the vibrator with said new drive signal to produce an output signal having minimized harmonic distortion.

12. The method of claim 11 in which steps (a) through (k) are repeated for each harmonic of interest of said fundamental frequency.

13. The method of claim 11 in which said fundamental frequencies are separated by at least 3 hertz.

14. The method of claim 13 in which interpolation is utilized upon said correction signal to obtain the amplitude and phase for every harmonic to be corrected for every point in said new drive signal.

15. The method of claim 11 in which there initially is generated for a selected fundamental frequency signals representative of all harmonic distortions of interest related to that selected fundamental frequency.

16. The method of claim 11 wherein said new drive signal is substituted for the signal generated in step (a) and repeating steps (b) through (k).

17. A method of operating a marine vibrator with a sweep signal comprised of a band of fundamental frequencies to produce an output signal having minimized harmonic distortion, said sweep signal being formulated on a non-real time basis in accordance with the following steps:

producing a plurality of harmonic distortion signals each related to a fundamental frequency of said sweep signal, varying the phase and amplitude of said harmonic distortion signals to produce for each with the vibrator suites of variations thereof, selecting from among the suites of variations those harmonic distortion signals having phase and amplitude values which produce a minimum value in harmonic distortion signal amplitude for each fundamental frequency of said sweep signal, summing each of said selected signals with its related fundamental frequency to produce a vibrator sweep signal comprised of fundamental frequencies and harmonics thereof; and driving the marine vibrator with said sweep signal.

* * * * *